(12) United States Patent
Schäfer et al.

(10) Patent No.: US 12,014,847 B2
(45) Date of Patent: Jun. 18, 2024

(54) CABLE FOR CONNECTING SYSTEM COMPONENTS

(71) Applicant: Aptiv Technologies AG, Schaffhausen (CH)

(72) Inventors: Christian Schäfer, Bochum (DE); Martin Bornemann, Nuremberg (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 0 days.

(21) Appl. No.: 18/054,845

(22) Filed: Nov. 11, 2022

(65) Prior Publication Data

US 2023/0178265 A1 Jun. 8, 2023

Related U.S. Application Data

(60) Provisional application No. 63/285,973, filed on Dec. 3, 2021.

(51) Int. Cl.
*H01B 7/18* (2006.01)
*B60R 16/023* (2006.01)
(Continued)

(52) U.S. Cl.
CPC ......... *H01B 7/1805* (2013.01); *B60R 16/023* (2013.01); *H01B 11/10* (2013.01); *H01B 13/06* (2013.01)

(58) Field of Classification Search
CPC ............ H01B 7/17; H01B 7/18; H01B 7/184; H01B 7/02; H01B 7/1875; H01B 7/28;
(Continued)

(56) References Cited

U.S. PATENT DOCUMENTS 1,305,247 A 6/1919 Beaver et al.
2,544,233 A * 3/1951 Kennedy ............... H01B 7/282
174/117 R
(Continued)

FOREIGN PATENT DOCUMENTS

CN 105051834 A 11/2015
DE 2516830 A1 10/1976
(Continued)

OTHER PUBLICATIONS

"Foreign Office Action", EP Application No. 19202394.3, Mar. 13, 2023, 10 pages.
(Continued)

*Primary Examiner* — Krystal Robinson

(57) ABSTRACT

Described are cables for connecting components of computing systems. The cables improve automation and resulting performance of high frequency and/or high speed signal transmissions by providing reliable transmission paths between hardware components. An example cable includes parallel conductors and a dielectric core that secures the parallel conductors along the length using parallel channels in opposite sides of the dielectric core. An alignment structure is also formed in the dielectric core, which has a shape along the length of the cable. A cable jacket surrounds the parallel conductors and the dielectric core. The cable jacket is contoured to follow the shape of the alignment structure. The dielectric core can be formed to maintain consistent separation between the parallel channels along the length of the cable to match impedance of the parallel conductors along the length of the cable, whether the cable lays flat or bends around corners.

20 Claims, 10 Drawing Sheets

(51) Int. Cl.
*H01B 11/10* (2006.01)
*H01B 13/06* (2006.01)

(58) Field of Classification Search
CPC ...... H01B 7/2806; H01B 7/282; H01B 7/295; H01B 11/22; H01B 7/285; H01B 7/42; H01B 11/002; H01B 11/12; H01B 13/00; H01B 13/22; H01B 7/04; H01B 7/08; H01B 7/1805; H01B 7/181; H01B 7/189; H01B 7/225; H01B 7/24; H01B 7/2825; H01B 7/29; H01B 7/292; H01B 7/32; H01B 7/324; H01B 7/423; H01B 9/00; H01B 9/006; H01B 9/02

See application file for complete search history.

(56) References Cited

U.S. PATENT DOCUMENTS

| | | | | |
|---|---|---|---|---|
| 2,804,494 | A | | 8/1957 | Fenton |
| 3,209,064 | A | * | 9/1965 | Cutler .................. H01B 11/00 333/243 |
| 3,800,066 | A | | 3/1974 | Whitfill et al. |
| 4,409,431 | A | * | 10/1983 | Neuroth .................. H01B 7/29 174/109 |
| 4,532,374 | A | * | 7/1985 | Neuroth .................. H01B 7/22 174/109 |
| 4,600,268 | A | | 7/1986 | Spicer |
| 5,565,653 | A | * | 10/1996 | Rofidal .................. H01B 11/02 174/115 |
| 6,140,587 | A | * | 10/2000 | Sackett ................ H01B 11/002 174/113 C |
| 7,214,883 | B2 | | 5/2007 | Leyendecker |
| 7,214,884 | B2 | * | 5/2007 | Kenny .................. H01B 11/04 174/113 C |
| 7,401,961 | B2 | | 7/2008 | Longatti et al. |
| 8,878,068 | B2 | | 11/2014 | Goto et al. |
| 2003/0205402 | A1 | * | 11/2003 | Koyasu .................. H01B 11/04 174/113 C |
| 2010/0089614 | A1 | | 4/2010 | Debladis et al. |
| 2013/0277087 | A1 | | 10/2013 | Hayakawa et al. |
| 2014/0251652 | A1 | | 9/2014 | Poulsen et al. |
| 2014/0262425 | A1 | | 9/2014 | Hopkinson et al. |
| 2016/0042840 | A1 | | 2/2016 | Zerna et al. |
| 2016/0372235 | A1 | | 12/2016 | Sugiyama et al. |
| 2020/0118713 | A1 | | 4/2020 | Bauer et al. |

FOREIGN PATENT DOCUMENTS

| | | | |
|---|---|---|---|
| EP | 2843445 A2 | 3/2015 | |
| EP | 4160626 A1 * | 4/2023 | ........... G02B 6/3849 |
| FR | 2500678 A1 | 8/1982 | |
| GB | 783064 A | 9/1957 | |
| GB | 2113903 A | 8/1983 | |
| JP | S5750127 U | 3/1982 | |
| JP | S6233690 B2 | 7/1987 | |
| JP | H1040745 A | 2/1998 | |
| JP | 2010073452 A | 4/2010 | |
| SU | 993337 A1 | 1/1983 | |
| WO | 9505668 A1 | 2/1995 | |

OTHER PUBLICATIONS

"Extended European Search Report", EP Application No. 19202394.3, Feb. 14, 2020, 9 pages.
"Foreign Office Action", CN Application No. 201910958599.2, Mar. 2, 2022, 15 pages.
"Foreign Office Action", CN Application No. 201910958599.2, Aug. 24, 2021, 17 pages.
"Foreign Office Action", CN Application No. 201910958599.2, Dec. 11, 2020, 24 pages.
"Foreign Office Action", DK Application No. PA 2019 70632, Dec. 11, 2019, 9 pages.
"Foreign Office Action", EP Application No. 19202394.3, Jun. 11, 2021, 6 pages.
"Foreign Office Action", EP Application No. 19202394.3, Nov. 12, 2020, 8 pages.
"Foreign Office Action", JP Application No. 2019-185635, Jan. 26, 2022, 12 pages.
"Foreign Office Action", JP Application No. 2019-185635, May 7, 2021, 10 pages.
"Foreign Office Action", JP Application No. 2019-185635, Sep. 28, 2020, 12 pages.
"Foreign Office Action", KR Application No. 10-2019-0125247, Feb. 2, 2021, 12 pages.
"Foreign Office Action", KR Application No. 10-2019-0125247, Feb. 14, 2022, 6 pages.
"Foreign Office Action", KR Application No. 10-2019-0125247, May 6, 2022, 6 pages.
"Foreign Office Action", KR Application No. 10-2019-0125247, Aug. 24, 2021, 9 pages.

* cited by examiner

CABLE FOR CONNECTING SYSTEM COMPONENTS

CROSS-REFERENCE TO RELATED APPLICATION

This application claims the benefit of U.S. Provisional Application No. 63/285,973, filed Dec. 3, 2021, the disclosure of which is hereby incorporated by reference in its entirety herein.

BACKGROUND

Automobiles are advancing and relying on more and more computerized control and automation. Some vehicle systems take a hierarchical approach to exchanging data between computer systems (e.g., processors, controllers) and devices (e.g., sensors, controls) distributed or arranged in different ways to provide a particular driving function. As these systems become more and more complex, ensuring reliable high-quality data connections (e.g., 5GBps, 25+GBps) for transferring large amounts of data with integrity is a problem that existing cable technology cannot support. Existing cable technology that transfers data reliably and at sufficient speed is presently suitable for use only in climate-controlled server rooms, and the like. In a dynamic and high-noise driving environment, a more robust cable that prevents signal degradation on high-speed or high-frequency connections can improve the reliability of vehicle systems and improve their driving functions.

TECHNICAL FIELD

This disclosure relates to cables for distributing power or communication signals among components of systems including installations in vehicles, appliances, and data centers.

SUMMARY

This summary is provided to introduce aspects of cables for connecting system components, which is further described below in the Detailed Description and Drawings. The description provides exemplified embodiments related to systems and methods for updating crowd-sourced data collection, which may be used in automotive applications. The exemplary embodiments do not intend to identify essential features of the claimed subject matter, nor restrict the scope of the claimed subject matter.

In one example, a cable is described. The cable includes a plurality of parallel conductors arranged about a length of the cable, and a dielectric core. The dielectric core includes a plurality of parallel channels located at opposite sides of the dielectric core, each parallel channel being configured to secure a corresponding conductor, and an alignment structure having a shape for the length of the cable. The cable further includes a cable jacket that surrounds the parallel conductors and the dielectric core, the cable jacket being contoured to follow the shape of the alignment structure.

In another example, a method is described. The method includes obtaining a plurality of parallel conductors that provide a length of a cable, forming a dielectric core for the length of the cable including forming a plurality of parallel channels located at opposite sides of the dielectric core and configured to secure a corresponding conductor, and an alignment structure having a shape for the length of the cable. The method further includes pressing each of the parallel conductors into the parallel channels to secure the corresponding conductor in each of the parallel channels and insulating the dielectric core and the parallel conductors by disposing a cable jacket along the length of the cable that is contoured to follow the shape of the alignment structure.

BRIEF DESCRIPTION OF THE DRAWINGS

Details related to a cable for connecting system components are described in this document with reference to the Drawings, which may use the same numbers to reference like features and components and hyphenated numbers to designate variations of these like features and components. The Drawings are organized as follows:

FIGS. 1-2 through 1-4 illustrate cross-sectional views of the example cable provided in FIG. 1-1;

FIGS. 2-1 and 2-2 illustrate cross-sectional views of an example dielectric core for an example cable, in accordance with techniques of this disclosure;

FIG. 3 illustrates a flow chart of a process for forming an example cable, in accordance with techniques of this disclosure;

FIGS. 4-1 to 4-6 illustrate cross-sectional views of the example cable being formed using the process provided in FIG. 3;

FIGS. 5-1 and 5-6 illustrate cross-sectional views of other examples of the cable provided in FIG. 1-1.

DETAILED DESCRIPTION

Figure 1:
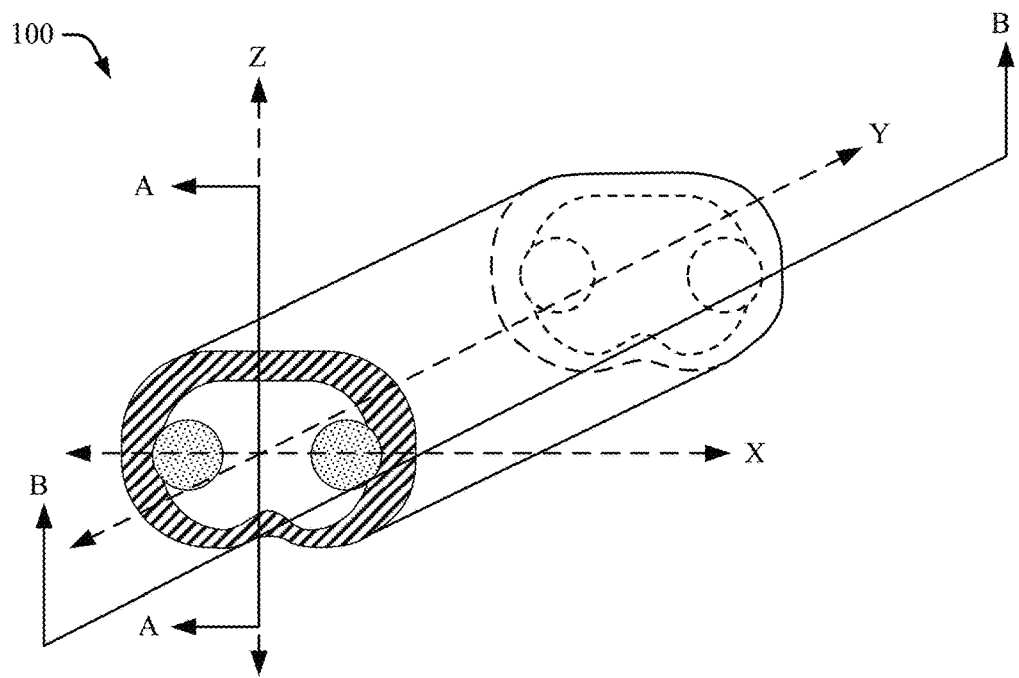
FIG. 1-1 illustrates an isotropic view of an example cable for connecting system components, in accordance with techniques of this disclosure.

Modern vehicles (e.g., automobiles, aircraft, marine craft), industrial systems, power systems, and server systems (e.g., data centers) are some examples of systems that may rely on wired cables to provide high-speed and reliable transmission paths among components distributed throughout a system. These cables can support data and/or power signal transmissions for embedded systems. However, due to their designs or complexities of the embedded system, some existing cables are too expensive to integrate, or unable to achieve transmission requirements (e.g., latency, bandwidth, integrity). For example, existing cables may introduce latency or reduce signal integrity. Further, existing cables may also not support complex routing and/or difficult connections specified in a component layout for an advanced computing system. Other measures can be added to the system outside of the cables to attempt to compensate for issues caused by poor-quality cable connections. In an embedded system on a vehicle, poor-performing communication and power signaling like this can cause catastrophic errors in driving functions and reduce safety.

This document describes a cable for connecting system components. The example cable improves performance of high-frequency and/or high-speed transmissions by providing reliable transmission paths between hardware components. An example cable includes parallel conductors and a dielectric core that can maintain consistent separation between the parallel conductors using parallel channels formed in opposite sides of a dielectric surface of the dielectric core. Each channel can have a partial opening that allows a partial deformation to secure a corresponding conductor in that channel. The dielectric core further includes an alignment structure with a shape for the length of the cable. To insulate the cable, a cable jacket surrounds the parallel conductors and the dielectric core including to be contoured with the shape of the alignment structure. This way, an outer surface of the cable jacket approximately mirrors the alignment structure, which can indicate a polarity of the parallel conductors and/or an orientation along the cable. For example, a host vehicle controller obtains signals and sensor data using the example cable. With high speed communication paths provided by the cable, critical information for ensuring safe driving is quickly distributed throughout a component hierarchy. The consistent separation and correct orientation maintained by the dielectric core no matter the routing of the cable helps to match impedance and prevent degradation.

An objective problem solved by the described techniques is in forming a low-cost cable that can support reliable wired connections for high speed or frequent transmissions among components in a system (e.g., a vehicle component hierarchy). The quality and speed of transmissions within communication channels is improved with a consistent matched impedance throughout the entire cable. The example cable can be formed using existing materials and without increasing production complexity.

Another problem overcome with these techniques is to improve routing of wires using a substantially flat cable design. The example cable design can ease difficulties integrating cables in a vehicle system; the cable supports a wide variety of routing options and connector types, to ensure reliable, high-speed data transfers throughout the vehicle. Some automobiles include circuit board type structures that provide structural integrity as well as a (e.g., planar) mounting surface for electrical components and/or electrical power trains. The example cable can be manipulated to lay flat, bend, and twist, without deteriorating transmission performance, which allows for a wide variety of physical installations, including on parts of vehicle structures where their features prevented or removed from consideration of more desirable cable layouts. The example cables are suitable for routing a variety of different conductor types, including different conductor shapes (e.g., flat conductor shape, cylindrical shape, rectangular shape, triangular shape), which promotes efficient and low-cost solutions for many applications using various conductor technologies. The example cable facilitates low-profile routing for flat wire connections to minimize the volume or area occupied by vehicle components, without introducing latency, losses, or signal degradation that can occur with other cable technology.

The cable described herein provides other advantages and can help to solve cable issues in other ways. Details of the above and other advantages are provided below with reference to the figures.

Figures 1, 2:
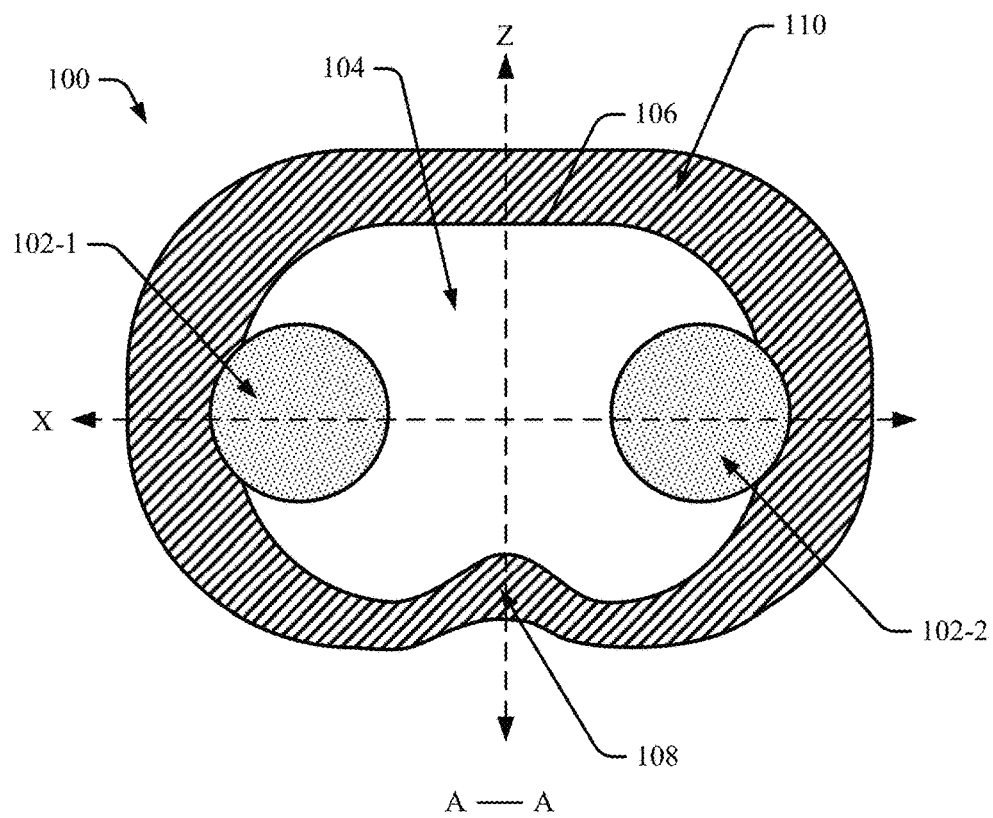
Figures 1, 2, 3:
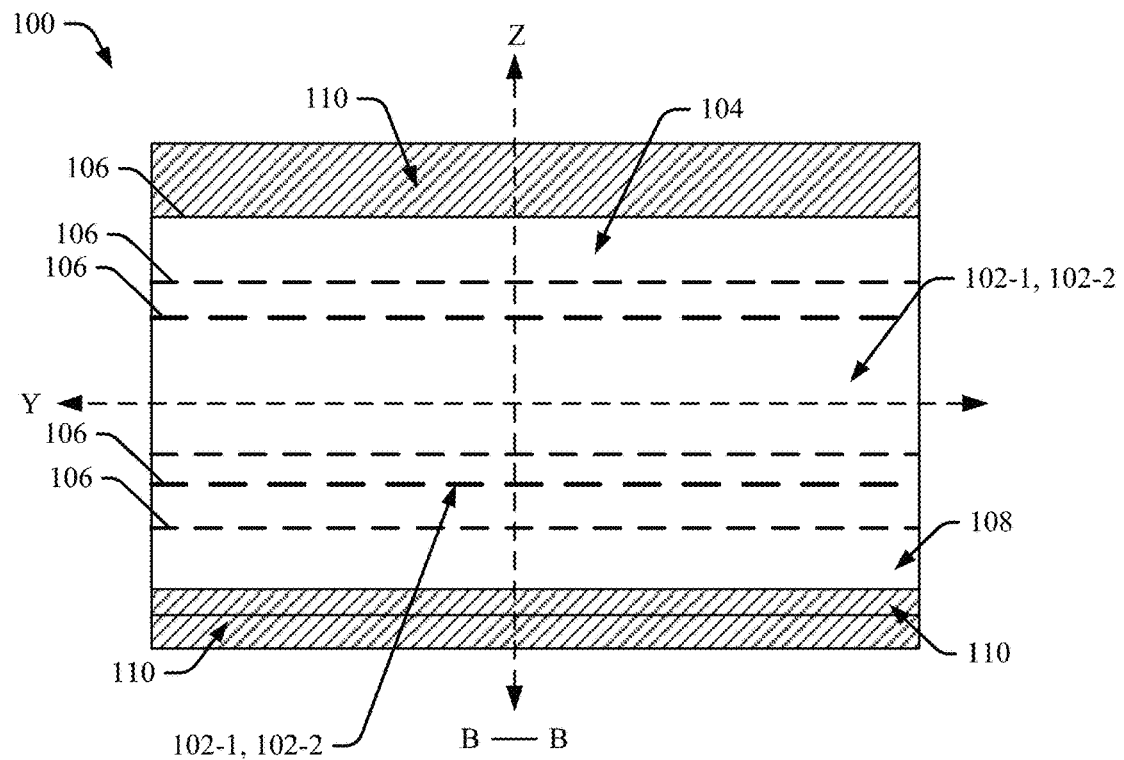

FIG. 1-1 illustrates an isotropic view of an example cable 100 for connecting system components, in accordance with techniques of this disclosure. A length of the cable 100 follows a Y-axis, a width of the cable 100 follows an X-axis perpendicular to the Y-axis, and a thickness of the cable 100 follows a Z-axis normal to the X-axis and the Y-axis. FIGS. 1-2 through 1-4 illustrate cross-sectional views of the cable 100 provided in FIG. 1-1. A lateral cross section of the cable 100 is shown in FIGS. 1-2 and 1-4; the lateral cross section is aligned to the X-axis and the Z-axis and defines an XZ-plane normal to the Y-axis. A longitudinal cross section of the cable 100 is shown in FIG. 1-3; the longitudinal cross section bisects the X-axis along a YZ-plane that is aligned to the Y-axis and the Z-axis.

The cable 100 includes two parallel conductors 102-1 and 102-2 (collectively referred to as parallel conductors 102) arranged about the length of the cable 100. Many advanced computing platforms rely on parallel conductor paths that can be provided with the cable 100. As one example, the parallel conductors 102 may each support an independent channel of a centralized communication network between multiple electronic control units of a vehicle. The parallel conductor 102-1 is arranged opposite the parallel conductor 102-2 about the Z-axis; the parallel conductors 102 are horizontally aligned relative a horizontal axis, shown as the X-axis. That is, the parallel conductors may be horizontally aligned above, below, or along the X-axis.

The cable 100 further includes a dielectric core 104 that maintains consistent separation between the parallel conductors 102. The dielectric core 104 can be any dielectric material that is suitable for supporting and insulating the parallel conductors 102 to promote impedance matching between the parallel conductors 102 along the length of the cable 100. For example, the dielectric core 104 can be formed of non-compressible material, including polytetrafluoroethylene (PTFE), fluorinated ethylene propylene (FEP), or any other suitable material. The specific composition of the dielectric core 104 can be adjusted to achieve a desired relative permittivity of the cable 100 along the entire length. In other words, the dielectric core 104 can be malleable at operating temperature to allow for routing or twisting along the length of the cable 100, however, even if bent or twisted, the dielectric core 104 maintains components of the cable 100 in a precise relative alignment all along the dielectric core 104.

The dielectric core 104 uses a dielectric surface 106 to maintain the consistent separation along the length of the cable. The dielectric surface 106 is shaped to form parallel channels in opposite sides of the dielectric core 104. The dielectric surface 106 defining each of the parallel channels can be shaped to match impedances of the parallel conductors 102 to a same impedance along the length of the cable 100. In addition, the dielectric surface 106 is shaped to form an indentation 108 along the length of the cable in a third side of the dielectric core 104 (i.e., the third side is than the opposite sides that include the parallel channels). The indentation 108 can be used to determine a correct polarity or orientation of the parallel conductors 102 along any location of the cable 100. In this way, the indentation 108 allows for faster and simplified installation and/or repair of the cable 100 in systems (e.g., a vehicle).

For example, the dielectric surface 106 includes a parallel channel for the parallel conductor 102-1 on one side of the Z-axis through the dielectric core 104. On an opposite side of the Z-axis and the dielectric core 104, the dielectric surface 106 includes another parallel channel for the parallel conductor 102-2. Below the X-axis and the parallel channels, the indentation 108 is centered with the Z-axis and provides a visually distinct feature in the dielectric surface 106 between the parallel channels.

When the parallel conductors 102 are inserted in the parallel channels, the dielectric core 104 allows a partial deformation in the dielectric surface 106 at each parallel channel. This partial deformation causes the dielectric surface 106 to partially surround either of the parallel conductors 102 to be retained within that channel. The parallel conductors 102 are retained within the parallel channels of the dielectric core 104 without a cable jacket or other surrounding component. The parallel channels can retain the parallel conductors 102 in a fixed relative position for the length of the cable 100. This way, consistent separation between the parallel conductors 102 is maintained for the length of the cable 100. The cable 100 can provide matched impedances on the parallel conductors 102 at any location along the cable 100. The consistent separation is maintained for complex cable routings; the cable 100 provides matched impedances on the parallel conductors 102 no matter if the cable 100 is turned, bent, or twisted.

The cable 100 further includes a cable jacket 110 that insulates the cable 100 and is contoured to exposed portions of the parallel conductors 102 that protrude outside the parallel channels on either of the opposite sides of the dielectric core 104. For example, the exposed portions of the parallel conductors 102 may include less than half a cross-sectional area of the conductors 102 that is protruding outside the parallel channels. The cable jacket 140 provides mechanical support (e.g., rigidity) to the cable 100 and electrically insulates the parallel conductors 102 from noise (e.g., an operating environment).

The cable jacket 110 is further contoured to remaining parts of the dielectric surface 106 that are outside the parallel channels. This includes contouring the cable jacket 110 to the third side of the dielectric core 104 such that the indentation 108 is mirrored or otherwise approximated in an outer surface of the cable jacket 110. The indentation 108 in the dielectric core 104 is mirrored or otherwise approximated to be visible in the outer surface of the cable jacket 110. This indication through the cable jacket 110 can be used to indicate an orientation or polarity of the parallel conductors 102 along the cable 100.

The cable 100 and other examples as contemplated by the other drawings improves upon existing cable technology for several reasons. A parallel pair configuration of the cable 100 can be formed to achieve consistent impedance (e.g., within a low tolerance, within a specific delta) for the parallel conductors 102 at any location on the cable 100. Additionally, the design of the cable 100 is intended produce a robust cabled connection yet still support full automation of the cable production and/or connector assembly. Integration of the cable 100 can be improved through this design. The cable 100 is non cylindrical, or in other words, mostly flat. For example, the exterior of the cable 100 can have a flattened shape and include the indentation 108 as a positioning feature for an automated assembly process. The cable 100 is flatter and not as circular as other existing cables, which allows the cable 100 to be compact in size. The unique shape of the cable 100 is conducive for automating connections formed between components of embedded systems, including forming connections with a reduced volume or profile. The lateral cross section of the cable 100 (through the width and/or thickness) is substantially flat rather than circular; the lateral cross section of the cable 100 is shaped similar to a flattened circle.

To appreciate an example size of the cable 100, consider FIG. 1-4, which includes dimensions 112-1 to 112-5. A maximum thickness 112-1 of the cable 100 is provided along the Z-axis. As one example, the maximum thickness 112-1 may be less than three millimeters (e.g., 2.3 mm, 2.5 mm). The maximum thickness 112-1 is greater than a minimum thickness of the cable 100 between the outer surfaces of the cable jacket 110 that are part of the indentation 108 or on an opposite side from the indentation on the dielectric core 104.

Side walls on either size of the Z-axis along the length (e.g., Y-axis) of the cable 100 provide the cable 100 with rigidity and the maximum thickness 112-1 between a top and bottom (e.g., third and fourth sides) of the cable 100. The side walls are separated by a maximum width 112-5 of the cable 100; the maximum width 112-5 may be greater than the maximum thickness 112-1, for example, the maximum width 112-5 may be less than five millimeters (e.g., 3.4 mm, 4.4 mm). The dielectric surface 106 and the cable jacket 110 adjacent to the side walls are approximately mirrored opposites about the Z-axis.

The maximum thickness 112-1 stretches from the third side of the cable 100, which includes the indentation 108, and the fourth side of the cable 100, which is the top of the cable 100 on opposite sides of the X-axis as the indentation 108. The indentation 108 narrows a middle thickness of the dielectric core 104 by causing the dielectric surface 106 on the third side to be closer to the dielectric surface 106 on the fourth side. This fourth side is relatively flat between the side walls, e.g., for the maximum width 112-5 of the cable 100, when compared to curves provided by the two side walls. Other than at the indentation 108, the third side is also substantially flat and parallel with the fourth side about the X-axis, e.g., for the maximum width 112-5 excluding parts of the cable 100 near the indentation 108.

Inside each of the side walls along the X-axis, the dielectric surface 106 is shaped to form the parallel channels for the parallel conductors 102. The parallel channels have a shape and a channel size 112-2 corresponding to a size and shape of the conductors 102. That is, the channel size 112-2 may correspond to a diameter of the parallel conductors 102 when the conductors 102 are cylindrical or tubular in shape. The channel size 112-2 may correspond to a width or other outside dimension of the parallel conductors 102 when the parallel conductors 102 are flat or rectangular in shape. As an example, the channel size 112-2 may be approximately one millimeter (e.g., 0.6 mm for a diameter of a round conductor, 1.0 mm for a larger round conductor). The channel size 112-2 is smaller than the maximum thickness 112-1 and the maximum width 112-5.

A channel separation 112-3 is provided by an interior region of the dielectric core 104 that is along the X-axis in-between the parallel channels. The channel separation 112-3 is substantially fixed for the length of the cable 100. An example of the channel separation 112-3 is approximately less than two millimeters (e.g., 1.0 mm, 1.7 mm).

A conductor displacement 112-4 exists between exposed portions of the parallel conductors 102; the exposed portions are each outside the parallel channels of the dielectric core 104. The conductor displacement 112-4 is greater than the channel separation 112-3 but less than the maximum width 112-5. An example of the conductor displacement 112-4 is less than four millimeters (e.g., 2.2 mm, 3.7 mm). The conductor displacement 112-4 exceeds an outer dimension on the X-axis for the dielectric core 104. Each exposed portion of the parallel conductors 102 is further from the Z-axis than any other part of the dielectric surface 106 on that side of the Z-axis. With the channel separation 112-3, the conductor displacement 112-4, and/or other parts of the cable 100 remaining consistent for the entire length of the cable 100, impedance matching among the parallel conductors 102 can be achieved without extra precautions being taken; which can achieve a difference in impedance for the parallel conductors 102 to be within a small tolerance at any point on the Y-axis.

These and other features of the cable 100 may improve production of vehicles and other complex computing systems that rely on high-quality cables to form routes of different shapes and complexity that enable high-speed transmission paths throughout the systems. Through improving cable production and/or cable integration, greater adoption of advanced computing hierarchies in vehicles, data centers, and other embedded systems that execute computing operations based on reliable, high-speed and/or high-frequency transmissions distributed throughout their architectures.

FIGS. 2-1 and 2-2 illustrate cross-sectional views of an example dielectric core 200 for an example cable, in accordance with techniques of this disclosure. The dielectric core 200 is an example of the dielectric core 104 for the cable 100. A lateral cross section of the dielectric core 200 is provided in FIG. 2-1, which cuts through the thickness and the width of the cable 100 on any location of the XZ-plane that is normal to a Y-axis of the dielectric core 200 (which is the same Y-axis for the cable 100). A longitudinal or lengthwise cross section of the dielectric core 200 is provided in FIG. 2-2. The lengthwise cross section slices along the length of the dielectric core 200 on a YZ-plane that is normal to the X-axis of the dielectric core 200. The X-axis, Y-axis, and Z-axis provided in the cross sections of the dielectric conductor 200 correspond to the X-axis, Y-axis, and Z-axis used above in reference to the cable 100 from FIGS. 1-1 to 1-4.

The dielectric surface 106 includes multiple parts. A first part 106-1 of the dielectric surface 106 is on one side of the Z-axis and is shaped to define one of two side walls of the dielectric core. The first part 106-1 is shaped to form a conductor channel 202-1 about the Y-axis. A second part 106-2 of the dielectric surface 106, on the other size of the Z-axis, is shaped to form a conductor channel 202-2 about the Y-axis, and into an opposite side wall of the dielectric core 200. The conductor channel 202-2 is formed in the second part 106-2 to be parallel to the conductor channel 202-1 that is formed in the first part 106-1 of the dielectric core 200. Collectively referred to as parallel channels 202, the conductor channel 202-1 and the conductor channel 202-2 are horizontally aligned (e.g., on the X-axis) in parallel, about a vertical axis (e.g., Z-axis).

A third part 106-3 of the dielectric surface 106, on a third side of the dielectric core 200, is shaped to form the indentation 108 in the dielectric core 200. A fourth part 106-4 of the dielectric surface 106 is on a fourth side of the dielectric core 200, which is opposite the X-axis from the indentation 108 and the third part 106-3. The fourth part 106-4 represents a portion of the dielectric surface 106 that is substantially flat, opposite the indentation 108, on the fourth side of the dielectric core 200. A fifth part 106-5 and a sixth part 106-6 of the dielectric surface 106 are on either size of the third part 106-3 and just below each of the parallel channels 202.

The cable jacket 110 is contoured to each remaining part of the dielectric surface 106 that excludes the first part 112-1 and the second part 112-1, which define the parallel channels 202. For example, the cable jacket 110 is contoured to insulate around the third part 106-3, the fourth part 106-4, the fifth part 106-5, and the sixth part 106-6 of the dielectric surface 106. The parallel channels 202 and the first part 106-1 and the second part 106-2 are aligned horizontally on the X-axis, and about the vertical Z-axis. The indentation 108 and the third part 106-3 is centered between the parallel channels 202, aligned to the vertical Z-axis and below the X-axis that aligns the parallel channels 202. The parts 106-5 and 106-6 define opposite portions of the dielectric surface 106 located on either side of the Z-vertical axis, between the parallel channels 202 and the indentation. Exposed portions of the parallel conductors 102 protrude outside the parallel channels 202 (e.g., away from the Z-axis, away from the first part 106-1 and the second part 106-2) when remaining portions of the parallel conductors 102 are press fit into the parallel channels 202. The exposed portions of the parallel conductors 102 protrude outside the dielectric core 200 either between the fourth part 106-4 and the fifth part 106-4 or, on an opposite side of the dielectric core 200, between the fourth part 106-4 and the sixth part 106-6.

Because the parallel channels 202 allow the parallel conductors 102 to be only partially disposed within the dielectric core 200, the parallel conductors 102 protrude slightly from the cable 100 after stripping away the cable jacket 110. This design provides easier access to the parallel conductors 102, which can allow for easier connections.

The dielectric core 200 includes a partial opening to each of the parallel channels 202, which are bound by edges on either side that are referred to as opposing sets of retention structures 204. The partial opening to each of the parallel channels 202 is defined by two opposing retention structures each configured to deflect away, or otherwise shaped to deflect away, from the dielectric core 200 to provide a portion of the retention force from the retention structures 204 to the unexposed portions of the parallel conductors 102 that are inside the parallel channels 202. Each opposing set of the retention structures 204 is shaped to provide a retention force into one of the parallel channels 202 that causes the dielectric core 200 to tighten (e.g., narrow a gap between the dielectric surface 106 and a surface of the parallel conductors 102) to cause the parallel channels 202 to grip around unexposed portions of the parallel conductors 102 that are inside the parallel channels 202. The retention structures 204 do not provide the retention force until the conductors 102 are pressed into the parallel channels 202. The retention structures 204 are designed to reconfigure the dielectric core 200 and cause the dielectric core 200 to change the shape of the partial openings to the parallel channels 202. The retention structures 204 change shape because of a partial deformation that is allowed in the dielectric surface 106 when the parallel conductors 102 are pressed through the partial openings and into the parallel channels 202. The partial insertion of each of the parallel conductors 102 produces the partial deformation in the dielectric core 200, which causes the retention structures 204 to reverse and change; the retention structures 204 reposition into locked positions for retaining the parallel conductors 102 where a portion of the retention force can be constantly applied into the parallel channels 202.

The retention force is applied by the retention structures 204 between the dielectric core 200 and unexposed portions of the parallel conductors 102 that are within the parallel channels 202. The partial deformation is allowed when the parallel conductors 102 are pressed or positioned into the parallel channels 202. When the partial deformation of the dielectric core 200 occurs because of installation of the parallel conductors in the parallel channels 202, the retention structures 204 are allowed to deflect away from the parallel channels 202 such that the dielectric surface 106 in the retention structures 204 applies a portion of the retention force being directed into the parallel channels 202 to keep the parallel conductors 102 in position. For example, the conductor channel 202-1 includes a retention structure 204-1 and a retention structure 204-2 that define opposing edges for the partial opening into the conductor channel 202-1. On the opposite side of the dielectric core 200, the conductor channel 202-1 includes a retention structure 204-3 and a retention structure 204-4. The retention structure 204-1 applies part of the retention force for the parallel channel 202-1, and the retention structure 204-2 applies a remaining part of the retention force to that parallel channel. Similarly, the retention structure 204-3 and 204-4 apply each part of the retention force for the parallel channel 202-2.

FIG. 3 illustrates a flow chart of a process 300 for forming an example cable, in accordance with techniques of this disclosure. The process 300 can be used to form the cable 100 using a dielectric core such as the dielectric core 104 or the dielectric core 200. The process 300 simplifies cable formation, particularly, for communication and/or power cables used in high speed and/or low latency computing applications, including on vehicles, in data centers, or other applications. The process 300 includes steps that may be performed by automated equipment to produce higher quality cables than existing cables, and with less production and/or material cost.

At 302, parallel conductors are obtained for producing a cable. For example, two conductors to be used as the parallel conductors 102 are selected. The parallel conductors 102 can be of a variety of shapes and sizes. Copper wire made of wound strands or solid pieces can be used for the conductors 102, including round and flat wire conductors. In some cases, the parallel conductors 102 are each a single conductor, and in other cases, the parallel conductors 102 are separate bundles, groups, or twisted pairs of conductors.

At 304, a dielectric core is formed for the length of the cable (e.g., to maintain consistent separation between the parallel conductors). For example, a dielectric material is shaped into a rounded dielectric core along the length of the cable 100. The round dielectric core can be heated or otherwise deformed (e.g., dielectric material can be pressed or flattened) to fit a general desired dimensions for the lateral cross section. The dielectric core is first produced through cutting, stamping, and/or molded the dielectric material.

At 306, parallel channels located at opposite sides of the dielectric core are formed that are configured to secure a corresponding conductor, and also formed is an alignment structure having a shape for the length of the cable. For instance, a dielectric surface of the dielectric core is shaped to form parallel channels in opposite sides of the dielectric core in addition to an indentation, groove, notch, or other alignment structure with a shape along the length of the cable in a third side of the dielectric core. The parallel channels 202 can be cut or pressed into the first part 106-1 and the second part 106-2 of the dielectric surface to achieve a desired shape for the parallel channels 202. In some examples, shaping the dielectric surface 106 of the dielectric core 200 includes forming a partial opening to each of the parallel channels 202. This provides the retention structures 204 on opposing sides of the partial openings.

At 308, the parallel conductors are pressed into the parallel channels to secure the corresponding conductor in each of the parallel channels. This can cause a partial deformation in the dielectric surface that partially surrounds each of the parallel conductors. The partial deformation in the dielectric surface produces a retention force between the dielectric core and unexposed portions of the parallel conductors that are pressed within the parallel channels. For example, by including the retention structures 204 on opposing sides of the partial opening, the retention force is produced into the parallel channels 202 where the retention structures 204 contact each of the parallel conductors 102. In response to the partial deformation caused when the unexposed portions of the parallel conductors 102 is pressed within the parallel channels 202, the retention structures 204 can change shape to deflect away from the parallel channels 202 to provide a better fit around the parallel conductors 102.

In some examples, the partial openings to the parallel channels 202 is associated with an insertion force. Overcoming this insertion force enables the parallel conductors 102 to be pressed into the parallel channels 202 to cause the partial deformation. Pressing the exposed portions of the parallel conductors 102 with a sufficient insertion force to temporarily deflect the retention structures 204 inward to the partial opening prior to the retention structures 204 being allowed to deflect outward from the partial opening. The change in position of the retention structures 204 caused by the pressing of the parallel conductors 102 with sufficient insertion force causes the retention force to be constantly applied by the retention structures 204 on to unexposed portions of the parallel conductors 102 that are inside the parallel channels 202.

When the retention structures 204 are reconfigured because of the partial deformation in the dielectric core 200, the retention structures 204 contour around portions of the parallel conductors 102 that are inside the parallel channels 202. This resulting retention structure shift not only produces the retention force, but it can also cause feedback (e.g., a click sound, haptic response). In other words, at 308, by pressing the exposed portions of the parallel conductors 102 with the sufficient insertion force may produce a haptic response or audible feedback due to friction between the parallel conductors 102 and the retention structures 204 (e.g., when temporary inward deflections in the retention structures 204 change to be outward deflections in the retention structures 204 that produce the retention force). The insertion force can be adjusted by changing the material used in the dielectric core 200 to causes the desired haptic and/or audible feedback (e.g., haptic response, audible click sound, nearly inaudible sound), which may allow a confirmation that the parallel conductors 102 are clicked into place. The dielectric materials in the dielectric core 200 can be selected to provide a high degree of flexibility in its routing. Different flexibility characteristics of the dielectric core 200 can change an insertion force required to press the parallel conductors 102 into the parallel channels. In some cases, when the parallel conductors 102 are inserted, there may not be a noticeable amount of feedback (e.g., undetectable haptic response, a barely audible sound).

At 310, the dielectric core and the parallel conductors are insulated by disposing a cable jacket along the length of the cable that is contoured to follow the shape of the alignment structure (e.g., in an outer surface of the cable jacket). For example, the cable jacket 110 can be formed to surround the parallel conductors 102 and the dielectric core 200 in various ways. The thickness of the cable jacket 110 may depend on desired reliability of the cable 100. The cable jacket 110 is disposed to cause the indentation 108 in the dielectric core 200 to be apparent from an outer surface of the cable jacket 110 (e.g., on an underside of the cable 100).

With the cable 100 formed by the process 300, the cable 100 can be used in various ways. For example, the process 300 can include forming a connection with the parallel conductors 102 by coupling the exposed portion of the parallel conductors 102 in a portion of the cable 100 to respective contacts of a connector attached to that portion of the cable 100.

For example, preparing the cable for the connection may include striping the cable jacket 110 along that portion of the cable 100, or cutting through that portion of the cable 100, to reveal the exposed portion of the parallel conductors 102 in that portion of the cable 100. This stripping occurs prior to physically coupling the respective contacts to the exposed portion of the parallel conductors 102 revealed by preparing the cable 100. The physically coupling can include laser welding, solid welding, persistent melting, or other techniques to form a physical electrical connection between the parallel conductors 102 and the contacts of the connector.

In some examples, instead of stripping it, the process 300 can include maintaining insulation provided by the cable jacket 110 along that portion of the cable 100. The connector may be attached to the cable jacket 110 by crimping, through the cable jacket 110 at that portion of the cable 100 and up to (but not into) the dielectric surface 106, to electrically couple the respective contacts of the connector to the exposed portion of the parallel conductors 102 that remain insulated under the cable jacket 110 at that portion of the cable 100.

In some examples, the process 300 also includes using the indentation 108 that is available through the cable jacket 110 on the bottom of the cable 100 to facilitate integration. For example, the indentation can be used with robotic manufacturing equipment to determine a polarity of the parallel conductors 102 by identifying (e.g., with a camera or other sensor) the indentation 108 that appears under the outer surface of the cable jacket 110. The indentation 108 can enable a correct orientation of the cable 100 (e.g., by the robotic equipment) based on the polarity just prior to forming the connection with the parallel conductors 102 to double check that the connection is correct.

FIGS. 4-1 to 4-6 illustrate cross-sectional views of the example cable being formed using process provided in FIG. 3. For example, a graphic 400-1 shown in FIG. 4-1 demonstrates steps 302 through 306 of the process 300, just prior to the step 308. The dielectric core 104 is shaped to have the indentation 108 and the parallel channels 202 for receiving respective portions of the parallel conductors 102.

Figures 1, 2, 3, 4:
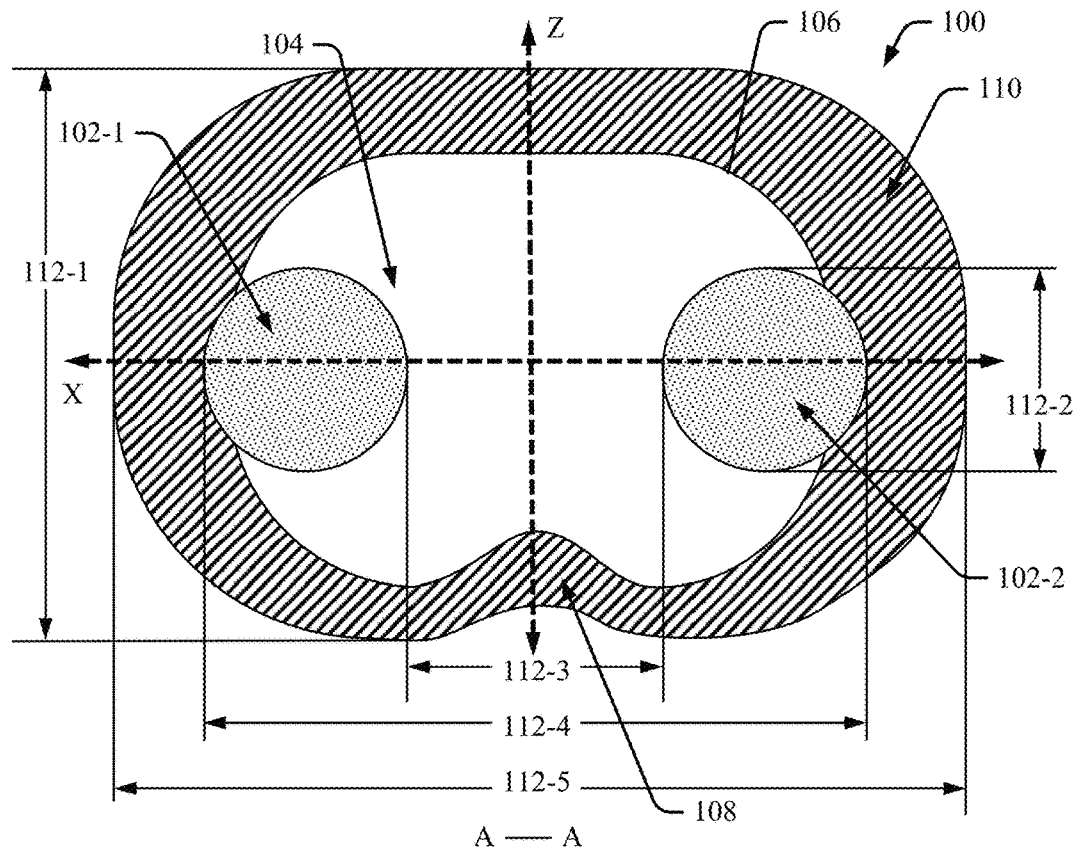
Figures 1, 2:
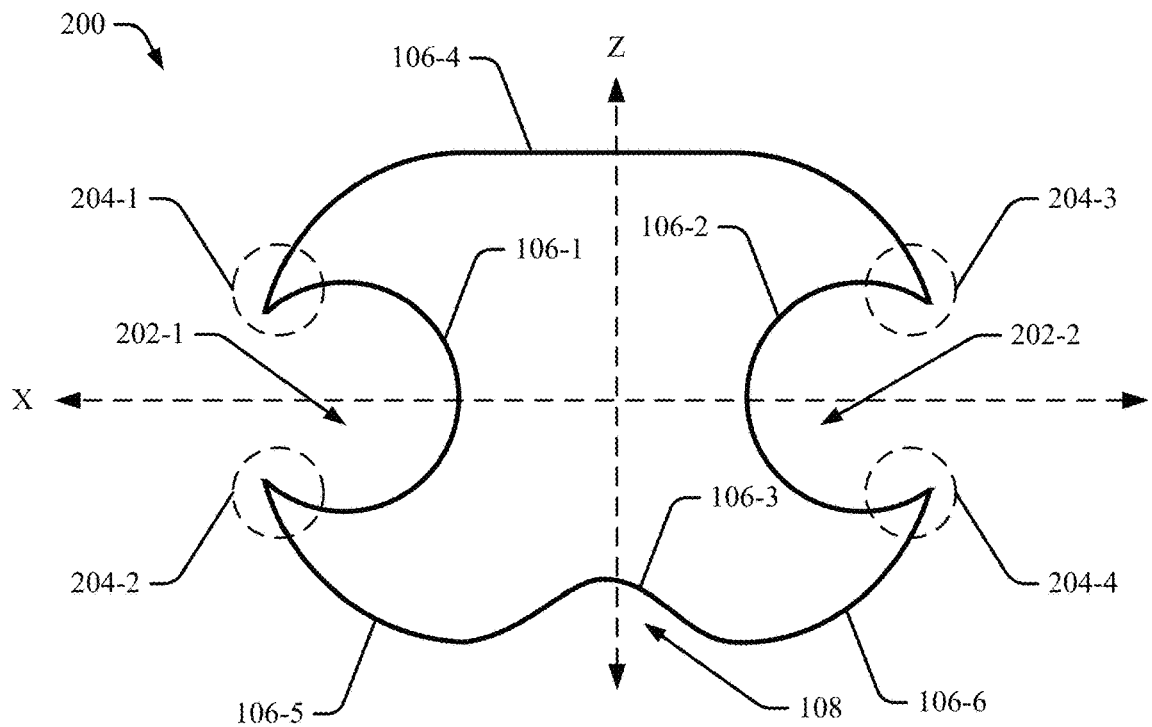
Figure 2:
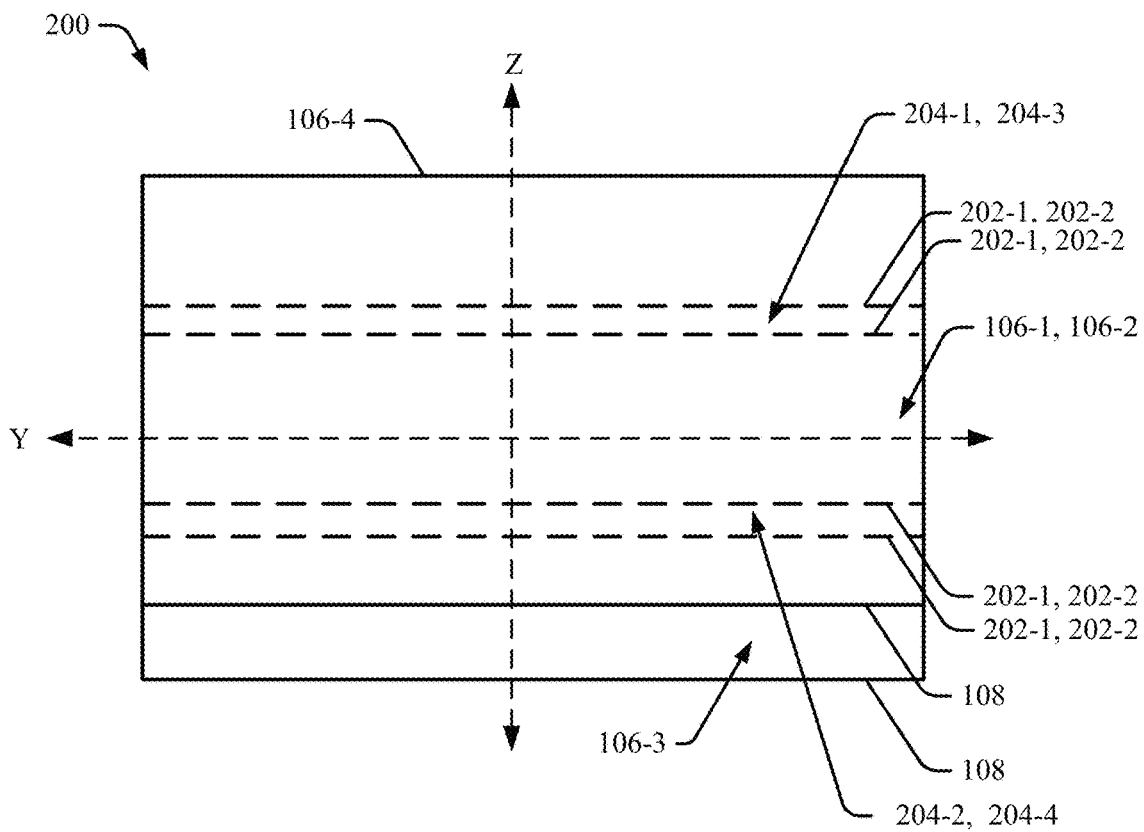
Figure 3:
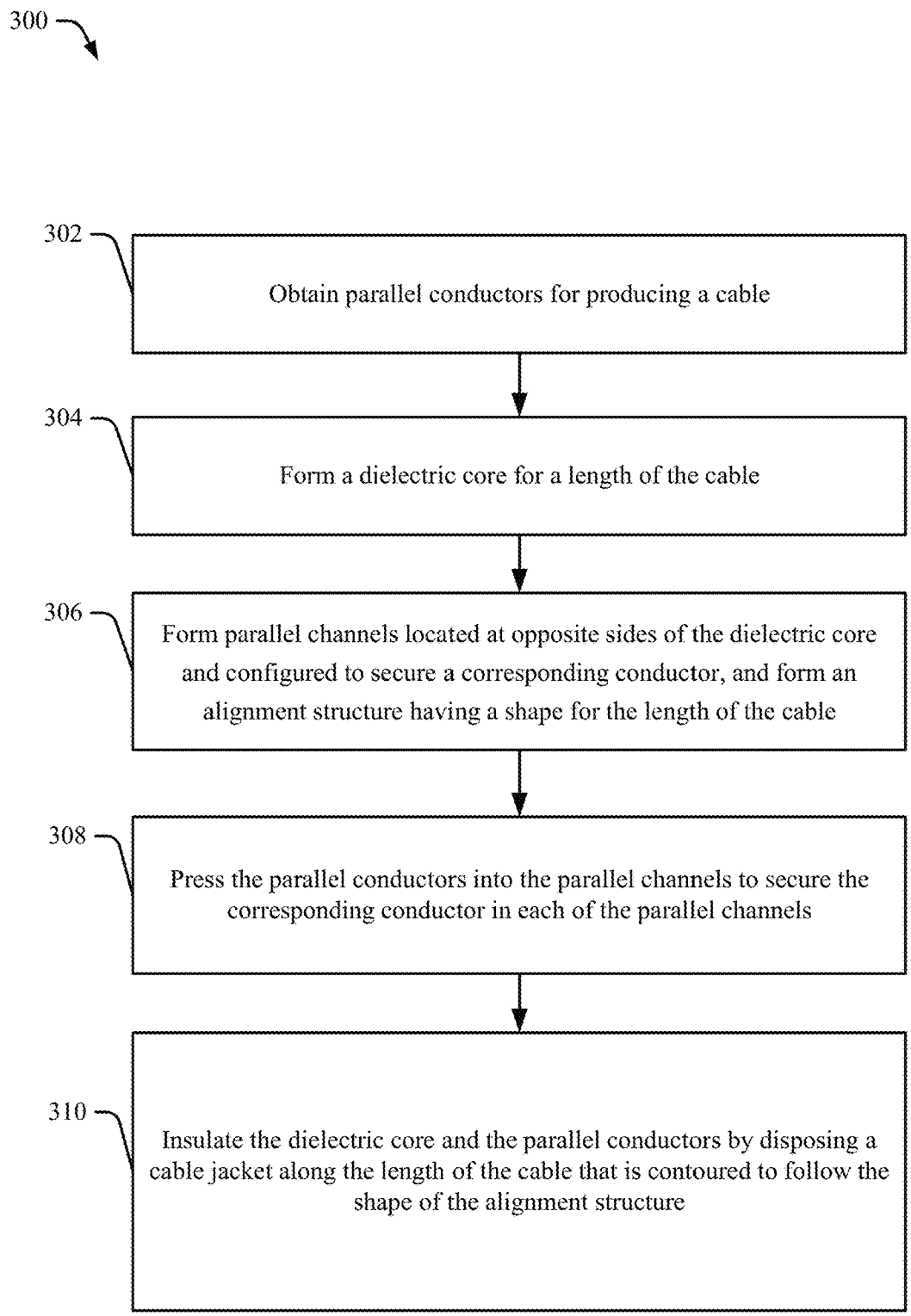

FIG. 4-2 has a graphic 400-2 that shows the dielectric core 104 during the step 308. Specifically, the retention structures at the openings to each parallel channel is allowed to deflect inward and then outward to cause the dielectric surface of the dielectric core 104 to snap and click around portions of the parallel conductors 102 that are within each of the parallel channels. In some cases, this causes a click or other feedback (e.g., nearly inaudible sound). The arrows show the direction of the insertion force applied to the parallel conductors 202 to cause the partial deformation in the dielectric core 104 that allows the retention structures 204 to snap into place.

FIG. 4-3 depicts a graphic 400-3 that shows the cable 100 after step 308. FIG. 4-4 includes a graphic 400-4 that shows the cable 100 after step 310. For example, the cable jacket 110 is contoured to surround the dielectric surface 106 of the dielectric core 104, excluding portions that are in contact with the parallel conductors 102. The cable jacket 110 further is contoured to surround exposed portions of the parallel conductors 102 that are not in contact with the dielectric surface 106.

Figures 1, 4:
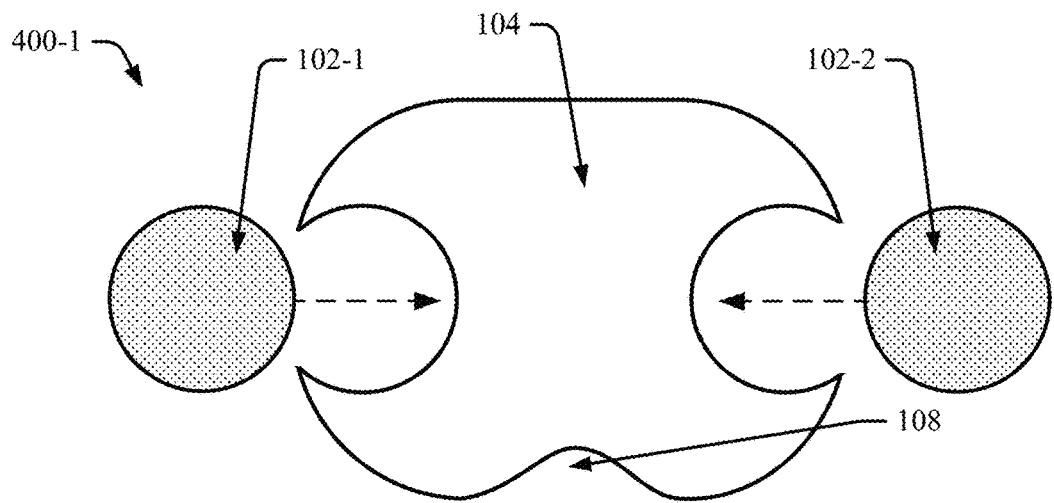
Figures 2, 4:
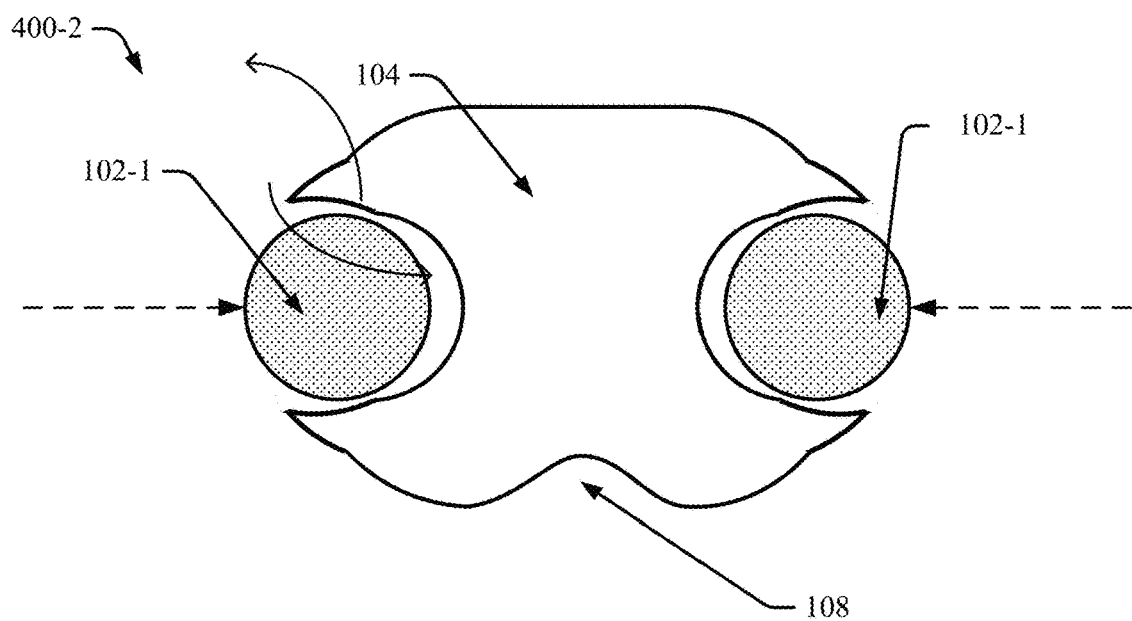
Figures 3, 4:
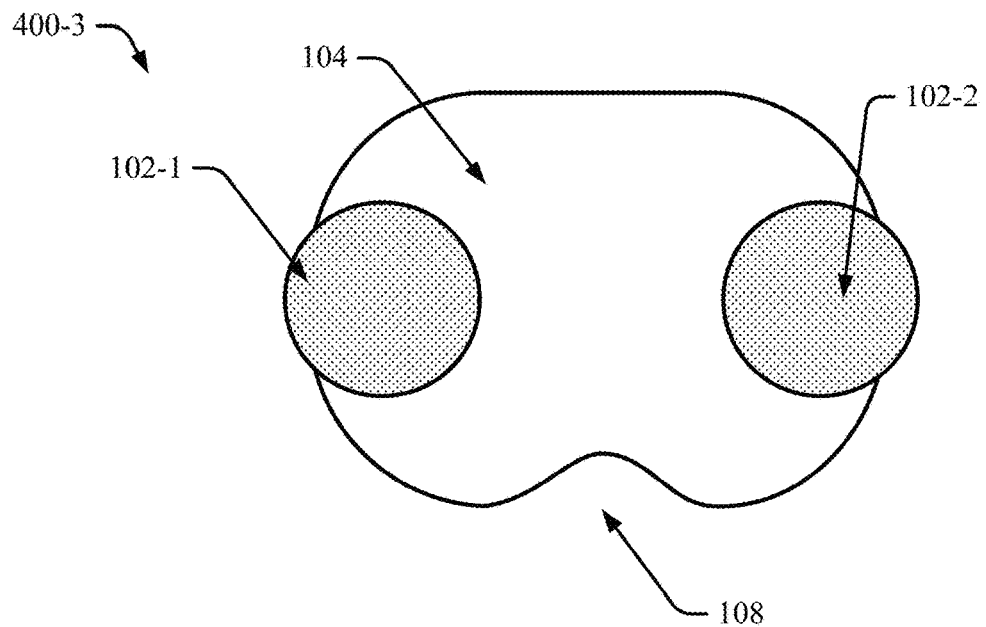
Figure 4:
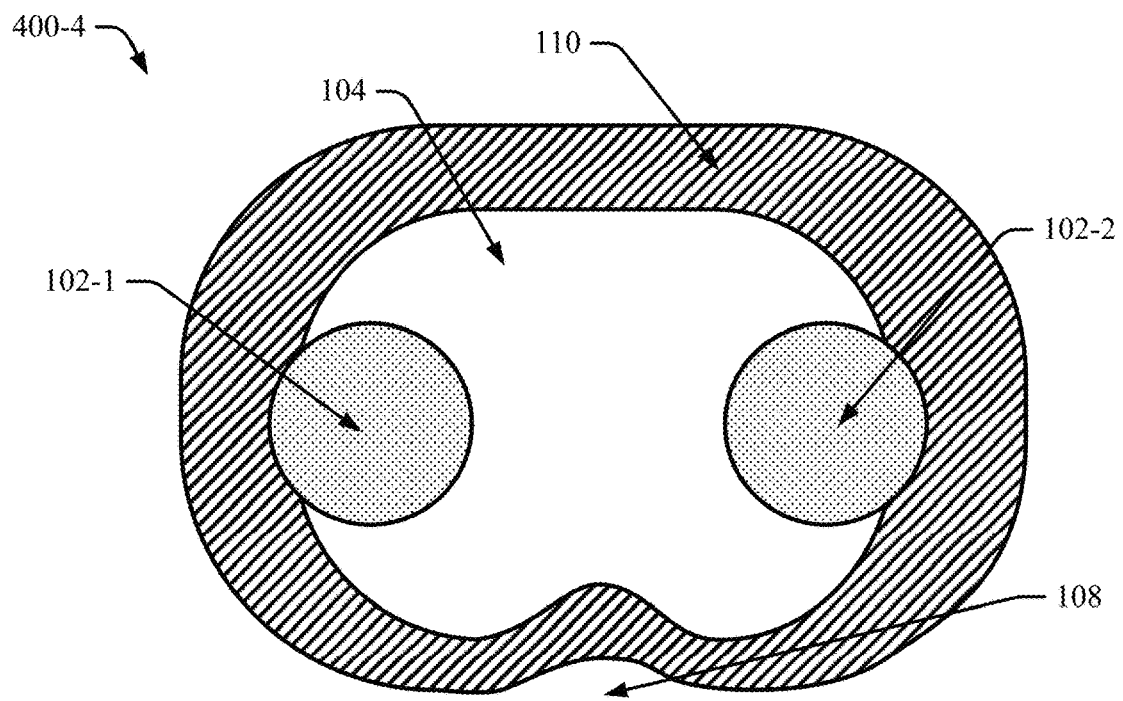
Figures 4, 5:
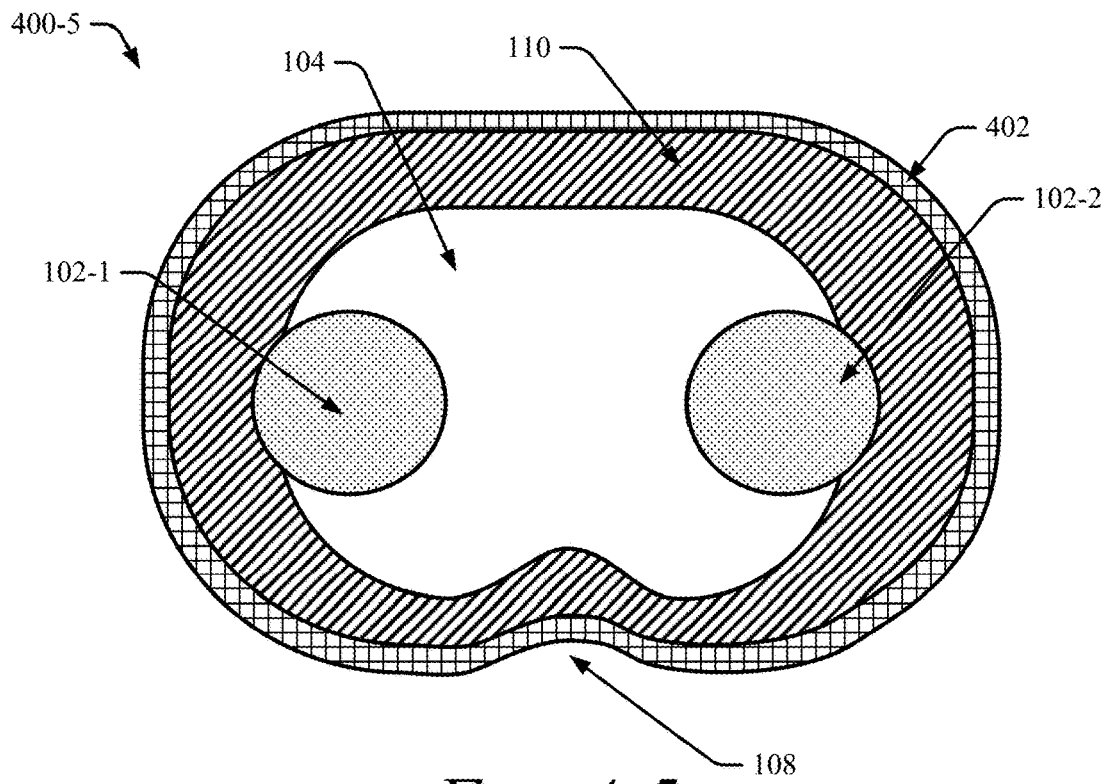

A graphic 400-5 of FIG. 4-5 shows the cable 100 after another step following step 310 to show how an optional shield layer can be easily added to the cable 100 to further improve its design. For example, a shielding layer 402 is contoured to surround the cable jacket 110. The shielding layer 402 is contoured to the cable jacket 110 to approximately mirror the indentation 108 within the shielding layer 402.

Figures 4, 5, 6:
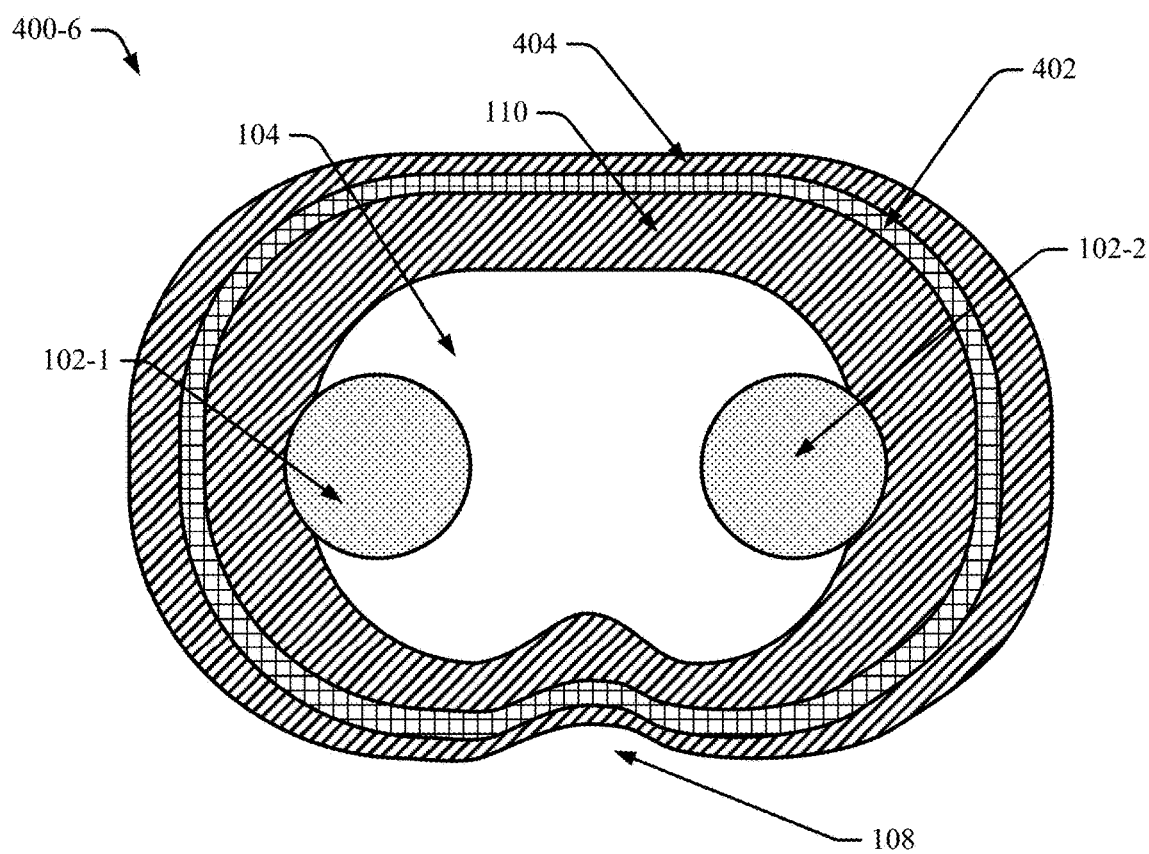
Figures 1, 5:
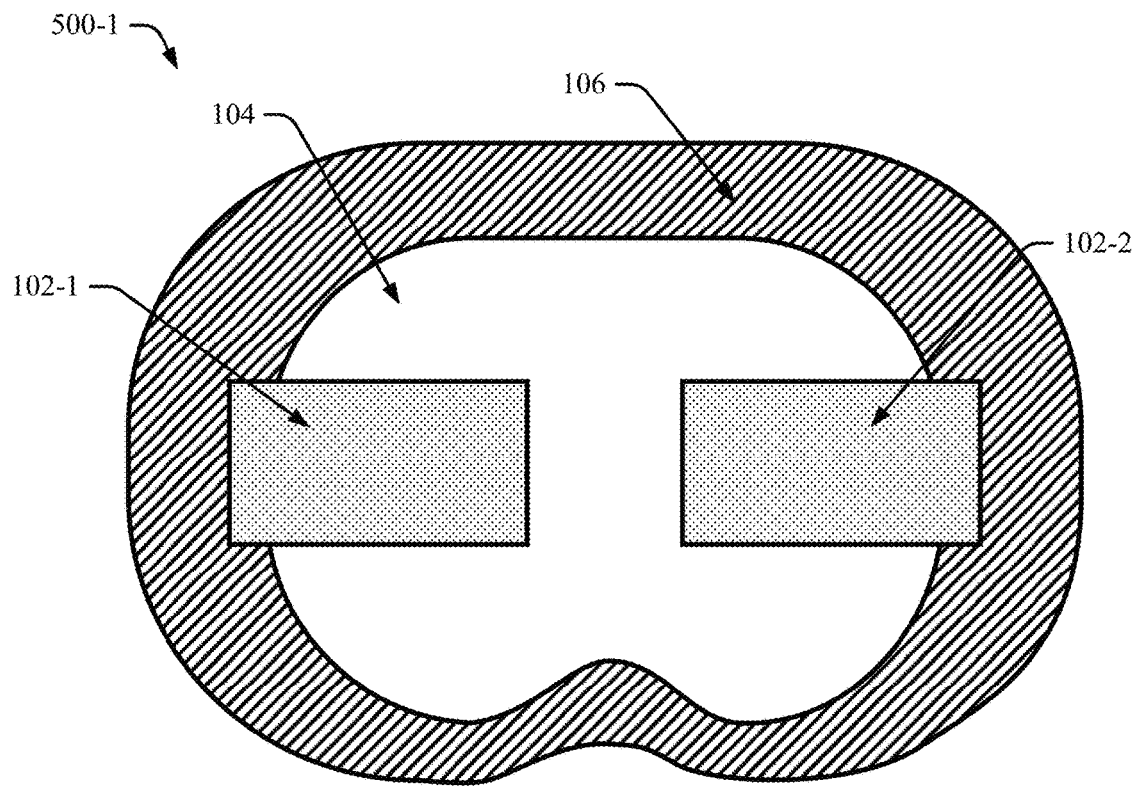
Figures 2, 5:
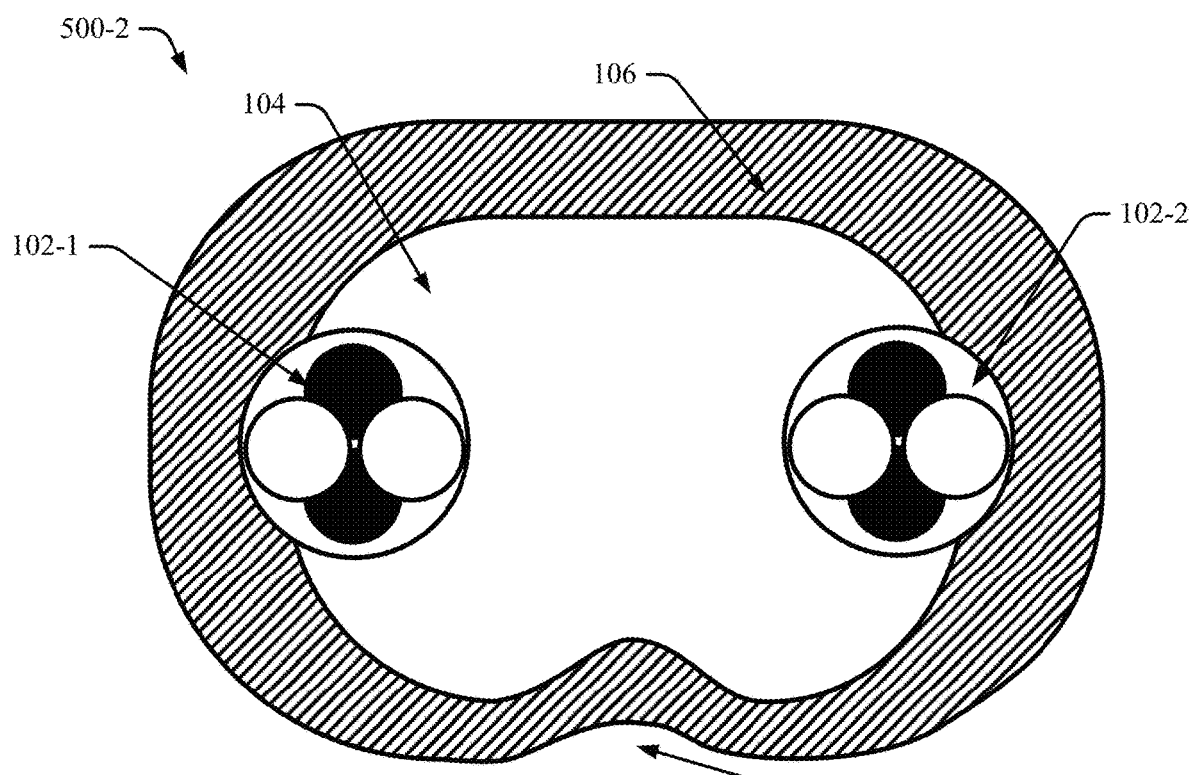
Figures 3, 5:
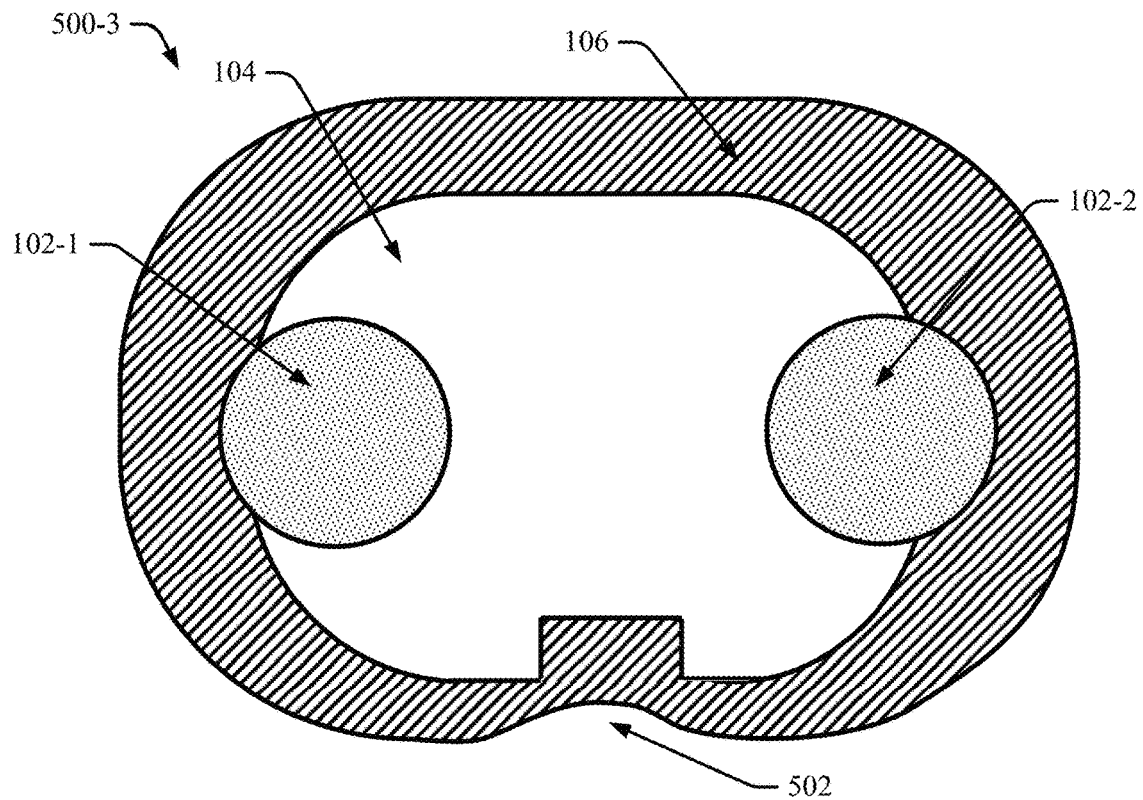
Figures 4, 5:
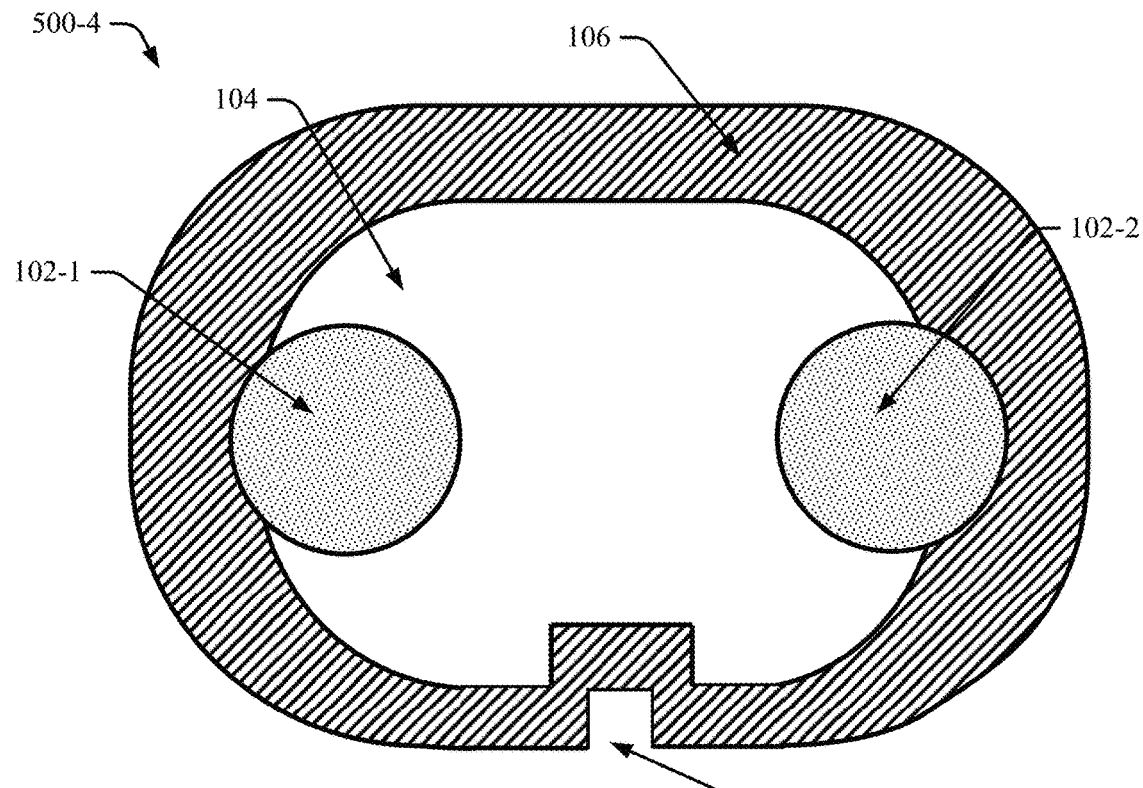
Figure 5:
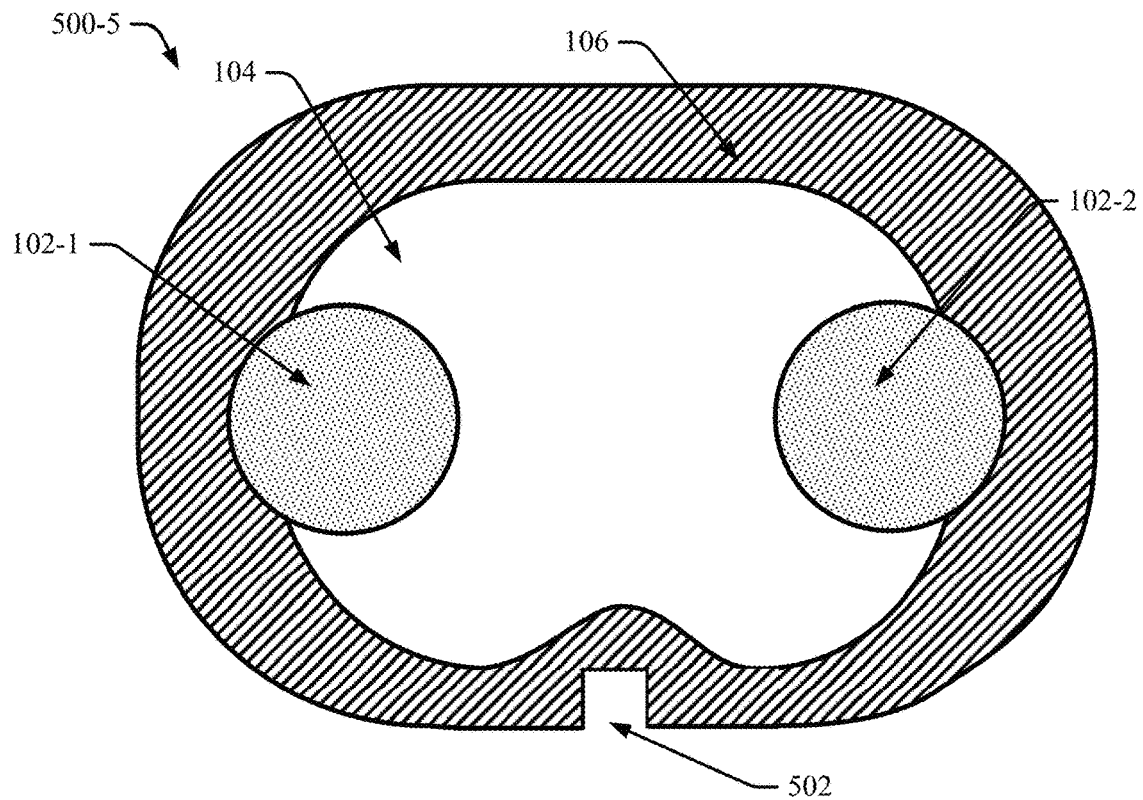
Figures 5, 6:
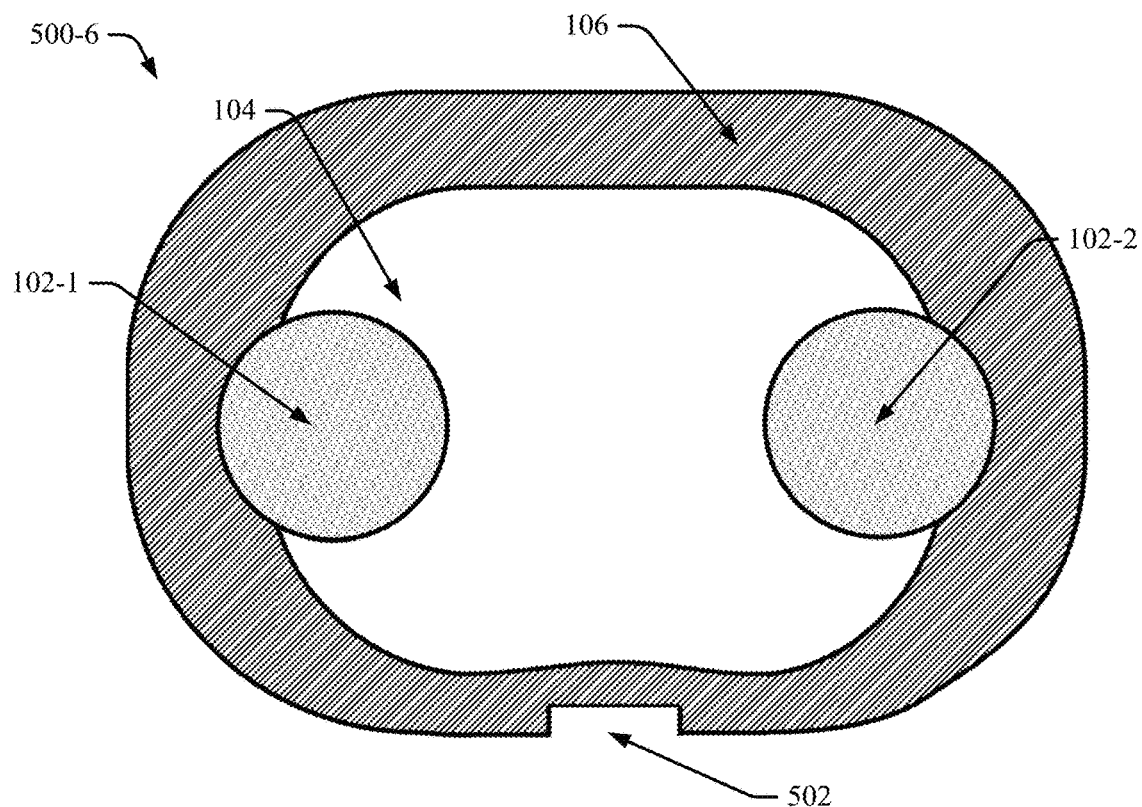

FIG. 4-6 has a graphic 400-6 that shows a second jacket can be added to the cable 100. That is, an outer jacket 404 can be contoured to the shielding layer including to approximately mirror the indentation in the outer jacket.

With this design and other versions of the cable 100, at least a portion of the length of the cable 100 is easily formed to lay flat against a mounting surface to provide a matched impedance between the parallel conductors 102. Further, the cable 100 can support a bend around corners for a cable route with the matched impedance between the parallel conductors 102.

FIGS. 5-1 to 5-6 illustrate cross-sectional views of other examples 500-1 to 500-6 of the cable provided in FIG. 1-1. The examples 500-1 to 500-6 can be combined in various ways or adapted to provide other variations of the cable 100. The parallel conductors 102 can be unshielded conductors including solid conductors. In each example, the parallel conductors 102 each have a shape that matches the dielectric surface 106 in either of the parallel channels 202. The shape of the parallel channels 202 and the shape of the parallel conductors 102 can be a rectangular shape, a rounded shape, a flat shape, or other shape that form tight fits for the parallel connectors 102.

FIG. 5-1 shows a lateral cross section of a first example 500-1 of the cable 100, which is an example flat conductor example. FIG. 5-2 shows a lateral cross section of a second example, 500-2 of the cable 100. The parallel conductors 102 in the second example 500-2 each represent parallel bundles, parallel groups, or parallel twisted pairs of conductors.

In a third example 500-3 of the cable 100 as shown in FIG. 5-3, the indentation 108 can also take on various shapes. In the third example 500-3, the parallel channels 202 represent partial tubes having a cylindrical or partial tube shape to match a cylindrical shape of the parallel conductors 102. Unlike the indentation 108 shown in other examples, an indentation 502 is formed in the outer jacket 110 as partial groove.

In a fourth example 500-4 of the cable 100 as shown in FIG. 5-4, the indentation 502 is formed in the outer jacket 110 as partial groove that closely matches the contour of the indentation 502, which is also a partial groove in this example. Using an indentation 502 with an edge in a groove may further promote correct orientation or alignment on a mounting surface. Guides on the mounting surface can be sized to allow the cable 100 to stay in place when the indentation 502 is pressed onto a reciprocally shaped guide.

In a fifth example 500-5 of the cable 100 as shown in FIG. 5-5, the indentation 502 is formed in the outer jacket 110 as partial groove like it is in the fourth example 500-4. However, depending on a size and shape of the indentation 108, the indentation 502 may have a wider size (e.g., as shown in the sixth example 500-6) or a deeper size (e.g., as shown in the fifth example 500-5).

The overall shape and size of the indentation or groove in the example cable can depend on application. Polarity or correct orientation of the example cable may be easily identifiable from an outside surface to improve their use in production and integration.

Some further exemplified embodiments in view of the techniques described above include:

Example 1: A cable comprising: a plurality of parallel conductors arranged about a length of the cable; a dielectric core comprising: a plurality of parallel channels located at opposite sides of the dielectric core, each parallel channel being configured to secure a corresponding conductor; and an alignment structure having a shape for the length of the cable; and a cable jacket that surrounds the parallel conductors and the dielectric core, the cable jacket being contoured to follow the shape of the alignment structure.

Example 2: The cable of any other example, wherein: each of the parallel conductors comprises a conductor shape that matches a dielectric surface of a corresponding channel.

Example 3: The cable of any other example, wherein: each of the parallel conductors comprises a cylindrical shape that matches a partial tube shape of the dielectric surface of the corresponding channel; or each of the parallel conductors comprises a rectangular shape or a flat conductor shape that matches a partial groove shape of the dielectric surface of the corresponding channel.

Example 4: The cable of any other example, wherein: each of the parallel conductors comprises an unshielded conductor including a solid conductor or a bundle of conductors; or each of the parallel conductors comprises a twisted pair of shielded or unshielded conductors.

Example 5: The cable of any other example, wherein: each of the parallel conductors comprises an exposed portion that protrudes outside the parallel channels and away from a dielectric surface on either of the opposite sides of the dielectric core.

Example 6: The cable of any other example, wherein, the exposed portion of each of the parallel conductors comprises less than half a cross-sectional area through an outer surface of that conductor.

Example 7: The cable of any other example, wherein parallel channels are spaced apart to match impedance of the parallel conductors along the length of the cable.

Example 8: The cable of any other example, wherein at least a portion of the dielectric core along the length of the cable is configured to: lay flat against a planar mounting surface and still match the impedance of the parallel conductors at that portion; and bend around corners for a turn in a cable route and still match the impedance of the parallel conductors at that portion.

Example 9: The cable of any other example, wherein each of the parallel channels: comprises a partial opening defined by opposing retention structures configured to deflect away from the dielectric core and to apply a retention force that secures the corresponding conductor within the partial opening to that channel.

Example 10: The cable of any other example, wherein the dielectric core comprises a cross-section including: a horizontal axis through the parallel conductors and the opposite sides of the dielectric core; a vertical axis that is normal to a third side of the dielectric core that is opposite the horizontal axis and is normal to a fourth side of the dielectric core that is opposite the third side and the horizontal axis.

Example 11: The cable of any other example, wherein the dielectric core comprises: a portion of the third side that is aligned to the vertical axis and includes the alignment structure; a portion of the fourth side is substantially flat opposite the portion of the third side that includes the alignment structure.

Example 12: The cable of any other example, wherein the alignment structure comprises an indentation, a cut, a notch, a groove, or other feature in a dielectric surface on the third side of the dielectric core to indicate an orientation of the parallel conductors along the length of the cable.

Example 13: The cable of any other example, further comprising: a shielding layer that surrounds the cable jacket; and an outer jacket being contoured to the shielding layer and the alignment structure surrounded by the cable jacket.

Example 14: A method comprising: obtaining a plurality of parallel conductors that provide a length of a cable; forming a dielectric core for the length of the cable including forming: a plurality of parallel channels located at opposite sides of the dielectric core and configured to secure a corresponding conductor; and an alignment structure having a shape for the length of the cable; pressing each of the parallel conductors into the parallel channels to secure the corresponding conductor in each of the parallel channels; insulating the dielectric core and the parallel conductors by disposing a cable jacket along the length of the cable that is contoured to follow the shape of the alignment structure.

Example 15: The method of any other example, wherein forming the dielectric core comprises: shaping a dielectric surface of the dielectric core for forming a partial opening to each of the parallel channels defined by opposing retention structures configured to deflect away from the dielectric core to allow a partial deformation in the dielectric surface within that channel and thereby cause a retention force from the retention structures that secures the corresponding conductor within the partial opening to that channel.

Example 16: The method of any other example, wherein pressing the parallel conductors into the parallel channels comprises: pressing exposed portions of the parallel conductors with a sufficient insertion force to deflect the retention structures away from the dielectric core such that the retention structures apply the retention force that secures the corresponding conductor within the partial opening to that channel.

Example 17: The method of any other example, wherein pressing the exposed portions of the parallel conductors with the sufficient insertion force comprises producing haptic or audible feedback caused by the partial deformation in the dielectric core as the retention structures deflect away to apply the retention force.

Example 18: The method of any other example, further comprising: forming a connection with the parallel conductors by coupling an exposed portion of each of the parallel conductors within a portion of the cable jacket to respective contacts of a connector attached to that portion of the cable jacket.

Example 19: The method of any other example, further comprising: determining a polarity of the parallel conductors by identifying the alignment structure from an outer surface of the cable jacket; and orientating the cable for forming the connection based on the polarity determined from the alignment structure.

Example 20: The method of any other example, further comprising at least one of: preparing the cable for a connection by striping the cable jacket along a portion of the cable jacket or cutting through that portion of the cable jacket to reveal an exposed portion of the parallel conductors in that portion of the cable jacket prior to physically coupling respective contacts of a connector to the exposed portion of the parallel conductors; or maintaining insulation provided by the cable jacket along another portion of the cable jacket and attaching another connector to the other portion of the cable jacket by crimping through the other portion of the cable jacket up to the dielectric surface of the dielectric core to electrically couple respective contacts of another connector to other exposed portions of the parallel conductors that remain insulated under the cable jacket at the other portion of the cable jacket.

Example 21: A method of forming the cable of any of examples 1 to 13 by performing at least some steps of the method of any of examples 14 to 20.

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. Although described primarily to improve vehicle or data center component performance, the techniques of the foregoing description can be adapted and applied to address problems in other applications using the example low cost, reliable transmission paths provided by the example cables.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A cable comprising:
   a plurality of parallel conductors arranged about a length of the cable;
   a dielectric core comprising:
      a plurality of parallel channels located at opposite sides of the dielectric core, each parallel channel being configured to secure a corresponding conductor; and
      an alignment structure having a shape for the length of the cable;
   a cable jacket that surrounds the parallel conductors and the dielectric core, the cable jacket being contoured to follow the shape of the alignment structure;
   a shielding layer that surrounds the cable jacket; and
   an outer jacket being contoured to the shielding layer and the alignment structure surrounded by the cable jacket.

2. The cable of claim 1, wherein
   each of the parallel conductors comprises a conductor shape that matches a dielectric surface of a corresponding channel.

3. The cable of claim 2, wherein:
   each of the parallel conductors comprises a cylindrical shape that matches a partial tube shape of the dielectric surface of the corresponding channel; or
   each of the parallel conductors comprises a rectangular shape or a flat conductor shape that matches a partial groove shape of the dielectric surface of the corresponding channel.

4. The cable of claim 1, wherein:
   each of the parallel conductors comprises an unshielded conductor including a solid conductor or a bundle of conductors; or
   each of the parallel conductors comprises a twisted pair of shielded or unshielded conductors.

5. The cable of claim 1, wherein
   each of the parallel conductors comprises an exposed portion that protrudes outside the parallel channels and away from a dielectric surface on either of the opposite sides of the dielectric core.

6. The cable of claim 5, wherein
   the exposed portion of each of the parallel conductors comprises less than half a cross-sectional area through an outer surface of that conductor.

7. The cable of claim 1,
   wherein parallel channels are spaced apart to match impedance of the parallel conductors along the length of the cable.

8. The cable of claim 7, wherein at least a portion of the dielectric core along the length of the cable is configured to:
   lay flat against a planar mounting surface and still match the impedance of the parallel conductors at that portion; and
   bend around corners for a turn in a cable route and still match the impedance of the parallel conductors at that portion.

9. The cable of claim 1, wherein each of the parallel channels:
   comprises a partial opening defined by opposing retention structures configured to deflect away from the dielectric core and to apply a retention force that secures the corresponding conductor within the partial opening to that channel.

10. The cable of claim 1, wherein the dielectric core comprises a cross-section including:
    a horizontal axis through the parallel conductors and the opposite sides of the dielectric core; and
    a vertical axis that is normal to a third side of the dielectric core that is opposite the horizontal axis and is normal to a fourth side of the dielectric core that is opposite the third side and the horizontal axis.

11. The cable of claim 10, wherein the dielectric core comprises:
    a portion of the third side that is aligned to the vertical axis and includes the alignment structure; and
    a portion of the fourth side is substantially flat opposite the portion of the third side that includes the alignment structure.

12. The cable of claim 10, wherein the alignment structure comprises an indentation, a cut, a notch, a groove, or other feature in a dielectric surface on the third side of the dielectric core to indicate an orientation of the parallel conductors along the length of the cable.

13. A method comprising:
    obtaining a plurality of parallel conductors that provide a length of a cable;
    forming a dielectric core for the length of the cable including forming:
       a plurality of parallel channels located at opposite sides of the dielectric core and configured to secure a corresponding conductor; and
       an alignment structure having a shape for the length of the cable;
    pressing each of the parallel conductors into the parallel channels to secure the corresponding conductor in each of the parallel channels; and
    insulating the dielectric core and the parallel conductors by disposing a cable jacket along the length of the cable that is contoured to follow the shape of the alignment structure,
    wherein forming the dielectric core comprises shaping a dielectric surface of the dielectric core for forming a partial opening to each of the parallel channels defined by opposing retention structures configured to deflect away from the dielectric core to allow a partial deformation in the dielectric surface within that channel and thereby cause a retention force from the retention structures that secures the corresponding conductor within the partial opening to that channel, and
    wherein pressing the parallel conductors into the parallel channels comprises pressing exposed portions of the parallel conductors with an insertion force to deflect the retention structures away from the dielectric core such that the retention structures apply the retention force that secures the corresponding conductor within the partial opening to that channel.

14. The method of claim 13, wherein pressing the exposed portions of the parallel conductors with the insertion force comprises producing feedback caused by the partial deformation in the dielectric core as the retention structures deflect away to apply the retention force.

15. The method of claim 13, further comprising:
forming a connection with the parallel conductors by coupling an exposed portion of each of the parallel conductors within a portion of the cable jacket to respective contacts of a connector attached to that portion of the cable jacket.

16. The method of claim 15, further comprising:
determining a polarity of the parallel conductors by identifying the alignment structure from an outer surface of the cable jacket; and
orientating the cable for forming the connection based on the polarity determined from the alignment structure.

17. The method of claim 13, further comprising at least one of:
preparing the cable for a connection by striping the cable jacket along a portion of the cable jacket or cutting through that portion of the cable jacket to reveal an exposed portion of the parallel conductors in that portion of the cable jacket prior to physically coupling respective contacts of a connector to the exposed portion of the parallel conductors; or
maintaining insulation provided by the cable jacket along another portion of the cable jacket and attaching another connector to the other portion of the cable jacket by crimping through the other portion of the cable jacket up to the dielectric surface of the dielectric core to electrically couple respective contacts of another connector to other exposed portions of the parallel conductors that remain insulated under the cable jacket at the other portion of the cable jacket.

18. A method comprising:
obtaining a plurality of parallel conductors that provide a length of a cable;
forming a dielectric core for the length of the cable including forming:
a plurality of parallel channels located at opposite sides of the dielectric core and configured to secure a corresponding conductor; and
an alignment structure having a shape for the length of the cable;
pressing each of the parallel conductors into the parallel channels to secure the corresponding conductor in each of the parallel channels;
insulating the dielectric core and the parallel conductors by disposing a cable jacket along the length of the cable that is contoured to follow the shape of the alignment structure; and
forming a connection with the parallel conductors by coupling an exposed portion of each of the parallel conductors within a portion of the cable jacket to respective contacts of a connector attached to that portion of the cable jacket.

19. A method comprising:
obtaining a plurality of parallel conductors that provide a length of a cable;
forming a dielectric core for the length of the cable including forming:
a plurality of parallel channels located at opposite sides of the dielectric core and configured to secure a corresponding conductor; and
an alignment structure having a shape for the length of the cable;
pressing each of the parallel conductors into the parallel channels to secure the corresponding conductor in each of the parallel channels;
insulating the dielectric core and the parallel conductors by disposing a cable jacket along the length of the cable that is contoured to follow the shape of the alignment structure; and
at least one of:
preparing the cable for a connection by striping the cable jacket along a portion of the cable jacket or cutting through that portion of the cable jacket to reveal an exposed portion of the parallel conductors in that portion of the cable jacket prior to physically coupling respective contacts of a connector to the exposed portion of the parallel conductors; or
maintaining insulation provided by the cable jacket along another portion of the cable jacket and attaching another connector to the other portion of the cable jacket by crimping through the other portion of the cable jacket up to the dielectric surface of the dielectric core to electrically couple respective contacts of another connector to other exposed portions of the parallel conductors that remain insulated under the cable jacket at the other portion of the cable jacket.

20. A method comprising:
obtaining a plurality of parallel conductors that provide a length of a cable;
forming a dielectric core for the length of the cable including forming:
a plurality of parallel channels located at opposite sides of the dielectric core and configured to secure a corresponding conductor; and
an alignment structure having a shape for the length of the cable;
pressing each of the parallel conductors into the parallel channels to secure the corresponding conductor in each of the parallel channels;
insulating the dielectric core and the parallel conductors by disposing a cable jacket along the length of the cable that is contoured to follow the shape of the alignment structure;
disposing a shielding layer around the cable jacket; and
disposing an outer jacket being contoured to the shielding layer and the alignment structure surrounded by the cable jacket.

* * * * *